(12) United States Patent
Collins

(10) Patent No.: US 11,214,340 B2
(45) Date of Patent: Jan. 4, 2022

(54) APPARATUS AND METHOD FOR LIFTING AND MOVING AN OBJECT UNDERWATER

(71) Applicant: Aubin Limited, Aberdeenshire (GB)

(72) Inventor: Patrick Collins, Aberdeenshire (GB)

(73) Assignee: Aubin Limited, Aberdeenshire (GB)

( * ) Notice: Subject to any disclaimer, the term of this patent is extended or adjusted under 35 U.S.C. 154(b) by 124 days.

(21) Appl. No.: 16/328,527

(22) PCT Filed: Sep. 7, 2017

(86) PCT No.: PCT/GB2017/052617
§ 371 (c)(1),
(2) Date: Feb. 26, 2019

(87) PCT Pub. No.: WO2018/051064
PCT Pub. Date: Mar. 22, 2018

(65) Prior Publication Data
US 2019/0193823 A1    Jun. 27, 2019

(30) Foreign Application Priority Data

Sep. 14, 2016 (GB) ..................... 1615632

(51) Int. Cl.
 *B63C 7/10* (2006.01)
 *B63C 7/06* (2006.01)
 *F16L 1/24* (2006.01)
(52) U.S. Cl.
 CPC ............... *B63C 7/10* (2013.01); *B63C 7/06* (2013.01); *F16L 1/24* (2013.01)

(58) Field of Classification Search
 CPC .... B63G 8/22; B63C 7/06; B63C 7/10; B63C 7/12; B63C 2007/125; F16L 1/24
 See application file for complete search history.

(56) References Cited

U.S. PATENT DOCUMENTS

| | | | |
|---|---|---|---|
| 7,500,439 B2 | 3/2009 | Collins | |
| 8,136,470 B1 | 3/2012 | Buescher et al. | |
| 10,232,919 B2 * | 3/2019 | Chitwood | B63B 35/28 |
| 2011/0281340 A1 * | 11/2011 | Turner | C12M 21/02 |
| | | | 435/257.1 |
| 2015/0345665 A1 | 12/2015 | Wilson | |
| 2016/0046857 A1 | 2/2016 | Collins | |
| 2019/0193823 A1 * | 6/2019 | Collins | B63C 7/06 |

FOREIGN PATENT DOCUMENTS

| | | |
|---|---|---|
| EP | 1867564 A1 | 12/2007 |
| GB | 2427173 A | 12/2006 |
| GB | 2466377 A | 6/2010 |

(Continued)

OTHER PUBLICATIONS

International Search Report for Application No. PCT/GB2017/052617 dated Dec. 11, 2017, 5 pages.

*Primary Examiner* — Andrew Polay
(74) *Attorney, Agent, or Firm* — Howard & Howard Attorneys PLLC

(57) ABSTRACT

An apparatus (10) for lifting and moving an object that is underwater. The apparatus including a first (12) and a second (14) chamber, both chambers containing a first (16) and a second (18) fluid. There is a conduit (20, 21) in fluid communication with the first and second chambers, the first and second fluids moveable between the first and second chambers.

14 Claims, 1 Drawing Sheet

(56) References Cited

FOREIGN PATENT DOCUMENTS

| GB | 2524868 A | 10/2015 |
|---|---|---|
| WO | 2014165765 A1 | 10/2014 |
| WO | 2014165768 A1 | 10/2014 |
| WO | 2016033278 A1 | 3/2016 |
| WO | 2016179371 A1 | 11/2016 |
| WO | 2018191679 A1 | 10/2018 |

* cited by examiner

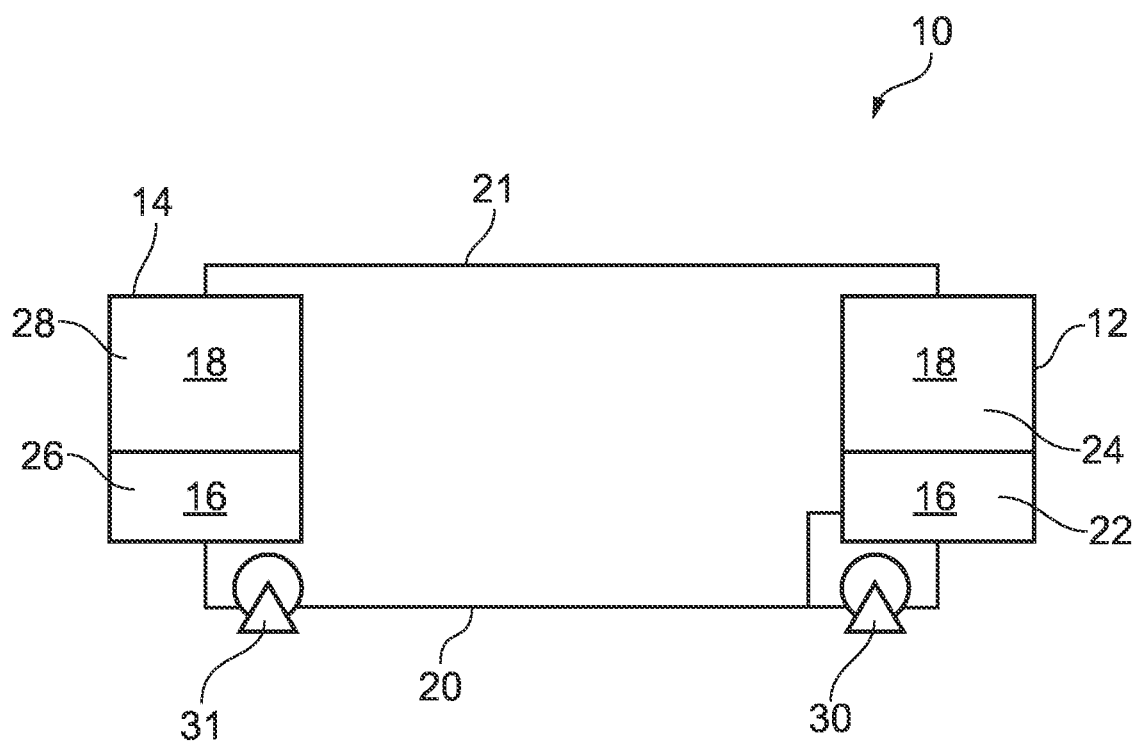

APPARATUS AND METHOD FOR LIFTING AND MOVING AN OBJECT UNDERWATER

CROSS-REFERENCE TO RELATED APPLICATIONS

The present application is the National Stage of International Patent Application No. PCT/GB2017/052617, filed on Sep. 7, 2017, which claims priority to and all the benefits of Application No. GB1615632.5, filed on Sep. 14, 2016, which are both hereby expressly incorporated herein by reference in their entirety.

The present invention relates to an apparatus for lifting and moving an object that is underwater.

There are many occasions when construction, maintenance or engineering is necessarily conducted underwater. One example is during the construction, maintenance and/or engineering of oil and gas wells. Another example is the installation and maintenance of renewable energy installations such as wind or tidal turbines. General subsea construction is also common place. These activities often require objects to be lifted and moved with great accuracy or held in place within the water column to allow them to be fitted or moved onto existing subsea structures.

Currently this is achieved in a number of different ways.

Firstly, vessels equipped with a crane are manoeuvred over an object to be lifted, the crane deployed and the object moved. This approach has a number of disadvantages. It is often difficult to maintain a constant height over the object to be lifted. Rough seas or high tidal conditions hinder operations, such that the crane can only be used in good weather. To solve this, the vessels can be equipped with expensive dynamic positioning technology. As a result, such vessels are very expensive to run and operate.

Secondly, work sometimes needs to be conducted next to or underneath existing structures which prevents work access using vessels. In such circumstances divers are used and lifting is achieved using air bags to create a buoyant lifting force. Because they are filled with gas, air bags will readily change their volume with changes in depth. This causes the buoyant lifting force to vary in a sometimes uncontrollable manner. This makes working with airbags difficult and dangerous.

Thirdly, in certain situations, lifting is conducted at a great depth, in excess of 1000 metres, and as much as 3000 metres. In these cases, air bags are ineffective due to the great pressures of gas that would be needed to inflate the bag and create the lift. Using a more conventional crane is also difficult because the wire suspending the load becomes an appreciable weight component of the total lift.

The present invention aims to mitigate at least some of the disadvantages of the known ways to conduct construction, maintenance or engineering underwater, and particularly to provide an often required lifting force.

In accordance with a first aspect of the present invention there is provided an apparatus for lifting and moving an object that is underwater, the apparatus comprising:
 a first and a second chamber, both chambers containing a first and a second fluid; and
 a conduit in fluid communication with the first and second chambers; wherein the first and second fluids are moveable between the first and second chambers.

The first fluid may be referred to as a ballast and/or counterbalancing ballast fluid and/or drive fluid. The first fluid is typically an incompressible fluid.

The first fluid is typically brine. The first fluid is normally water based. The first fluid may contain dissolved salts of one or more of caesium, calcium, and sodium bromide. The brine may comprise potassium formate and/or acetate. The first fluid is typically a Newtonian fluid and/or has Newtonian rheological properties.

The density of the first fluid is typically from 1 to 2 kg/L, optionally from 1.6 to 1.3 kg/L, typically from 1.5 to 1.35 kg/L and preferably from 1.46 to 1.38 kg/L.

The second fluid may be a buoyant fluid; an incompressible fluid; or an incompressible buoyant fluid.

It may be an advantage of the present invention that the apparatus provides for predictable and/or stable and/or safe load control and/or handling because the buoyancy of the second chamber is adequately controllable. The incompressibility of the first or second fluid, typically the first and second fluid, means that unlike an air bag, there is no change or little change in the buoyant force provided with changes in depth. The buoyant force is typically directly proportional to the volume of fluid pumped, so lift can be relatively easily calculated.

The density of the second fluid may be from 0.25 to 1 kg/L, optionally from 0.4 to 0.7 kg/L, typically from 0.5 to 0.65 kg/L and preferably from 0.54 to 0.62 kg/L.

The first and the second chamber may contain the same or substantially the same amount and/or volume of the first fluid and the same or substantially the same amount and/or volume of the second fluid. When the first and the second chambers contain substantially the same amounts of the first and second fluids their mass and buoyancy are substantially the same. The first and the second chambers contain substantially the same amount of the first and second fluids when the apparatus is not in use and therefore not being used to lift an object.

When the amount of the first fluid in the first chamber is increased, the mass of the first chamber is increased. When the amount of the second fluid in the second chamber is increased, the mass of the second chamber is reduced and the buoyancy of the second chamber is increased.

The first chamber normally houses a first and a second container. The first container normally contains the first fluid; the second container normally contains the second fluid. The second chamber normally houses a third and a fourth container. The third container normally contains the first fluid; the fourth container normally contains the second fluid.

It may be an advantage of the present invention that the first and second fluids are kept separate using the first and the second and the third and the fourth containers respectively.

One or more of the first, second, third and fourth containers may be a bag. When the first and/or third container is a bag, the second and/or fourth container is typically the remaining space in the first and second chamber respectively.

The first and second fluids may be immiscible. It may be an advantage of the present invention that when the first and second fluids are immiscible, the one or more of the first, second, third and fourth containers may not need to be a bag. The first and second fluids may therefore not need to be kept separate. Instead the immiscibility of the first and second fluids provides the required separation.

The first fluid is typically easier to pump than the second fluid. It may be an advantage of the present invention that pumping the first fluid provides an efficient way of moving the second fluid between the first and second chambers.

The first chamber may be referred to as a reservoir. The second chamber may be referred to as a lifting element. The first and a second chambers may be referred to as first and second enclosures.

The conduit in fluid communication with the first and second chambers is typically a first conduit in fluid communication with the first container of the first chamber and the third container of the second container. The apparatus may further comprise a second conduit. The second conduit is typically in fluid communication with the second container of the first chamber and the fourth container of the second chamber. The first and/or second conduits may be and/or may be referred to as an umbilical and/or a flowline.

The apparatus may comprise a pump for moving the first and/or second fluid through the conduit between the first and second chambers. The conduit typically passes into and out of the pump. The pump is typically in-line with the conduit. The pump may be a subsea pump. The pump may be powerable by a Remotely Operated Vehicle (ROV). The pump and ROV may be connectable via a hot stab connector. The pump may be powerable from a surface vessel.

There may be more than one pump. There may be one pump for the first fluid and another pump for the second fluid. There may be two pumps for the first fluid.

The maximum distance the second chamber and so also an object is moveable is determined by the length of the umbilical.

The first and second conduits may be arranged side by side or one inside the other. The first and/or second conduits may be storable and deployable from a reel.

In use, when the volume of the first fluid in the first container is increased, the volume of the first fluid in the third container is decreased. This pushes and/or displaces the second fluid out of the second container, into the fourth container. This increases the volume of the second fluid in the fourth container, thereby increasing the buoyancy of the second chamber and reducing the buoyancy of the first chamber. When the mass of the second chamber is reduced, the mass of the first chamber is increased.

The object is normally securable to the second chamber. In use the object may be secured under the second chamber. In use, the increased buoyancy of the second chamber typically creates an underwater buoyant force that can be used to lift the object. Alternatively or additionally, the second chamber may be locatable under the object. In use, the increased buoyancy of the second chamber typically creates an underwater buoyant force that can be used to raise the object through the water column.

When the object is neutrally buoyant it is effectively weightless underwater and this typically allows the object to be easily moveable.

The second chamber is normally attachable, typically permanently attachable, to the first chamber. The second chamber may normally be attachable, typically permanently attachable, to the first chamber by the conduit(s). The second chamber is normally moveable relative to the first chamber.

In use, adjusting the amount of the second fluid in the second chamber is used to control the amount of buoyancy provided by the second chamber and therefore control the position of the object. More second fluid in the second chamber, more buoyancy; less second fluid in the second chamber, less buoyancy.

When the apparatus comprises a second conduit, the apparatus for lifting and moving an object that is underwater may be and/or may be referred to as a self-contained or closed loop or sealed system. A volume of the first fluid that leaves the third container, passes along the first conduit and into the first container displaces, is matched and/or replaced by the same or substantially the same volume of the second fluid that leaves the second container, passes along the second conduit and into the fourth container.

In use a volume of the first fluid is moved simultaneously from the third container, along the first conduit and into the first container as substantially the same volume of the second fluid is moved from the second container, along the second conduit and into the fourth container.

It may be an advantage of the present invention that simultaneously pumping the first and second fluids reduces, typically halves, the amount of fluid that needs to be pumped to create a fixed buoyant force, compared to a system that just pumps a buoyant fluid.

It may be an advantage of the present invention that the volumes of first and second fluids are movable within the apparatus for lifting and moving an object underwater, providing a self-contained or closed loop or sealed system. This system is easier to operate and/or manoeuvre compared to other subsea lifting devices. Using the first and second fluids typically means that less fluid needs to be moved between the first and the second chamber to provide the same amount of lift and/or buoyancy and/or buoyant force, compared to other known apparatus and methods for a similar purpose. The less fluid that needs to be moved the less time it takes for lifting and moving an object that is underwater, compared to other known apparatus and methods for a similar purpose.

The apparatus may be locatable and/or securable to a platform or mat. This may be particularly useful if the apparatus is to be located on a soft surface, for example a soft seabed.

The apparatus may be deployable from the sea surface to the seabed as a complete unit. The complete unit would typically comprise the first and second chambers, conduit(s) and other optional features if present. The complete unit may comprise and/or may be referred to as a frame. It may be an advantage of the present invention that the greatest lifting capacity is that required to place the apparatus in the sea/water. Once in the sea/water, the buoyant fluid increases the buoyancy of the apparatus and reduces the lifting capacity required to lower the apparatus to the seabed. The apparatus may be neutrally buoyant.

It may be an advantage of the present invention that the apparatus can be lowered to the seabed at the same time as other equipment to be used in a subsea operation. The apparatus and other equipment can be left and/or stored on the seabed close to a work site. The crane and vessel used to lower the apparatus and other equipment to the seabed can then be moved away. This may reduce costs by reducing the amount of time the crane and vessel need to be at the site.

If the apparatus is too big to be lowered to the seabed in one trip, the apparatus may be separated into more than one section, the sections lowered to the seabed and the apparatus reconstructed on the seabed.

The apparatus, particularly the apparatus in a frame, may be movable on the seabed using one or more thrusters, motors, crawler tracks and cameras attached to the frame. The apparatus may comprise its own power source. It may be an advantage of the present invention that the apparatus with a power source can be remotely operated from the surface. The apparatus with a power source may mitigate the need for an ROV. This may advantageously reduce the cost of operating the apparatus and thereby reduce the cost of lifting and/or moving objects on the seabed.

The object is normally locatable on the seabed. The apparatus for lifting and moving an object underwater is also typically suitable for moving the object underwater. When the object is in seawater, the object is typically movable relative to the seabed. The object may be referred to as a load.

The buoyant fluid typically comprises a base fluid, microspheres, and a viscosifying agent. The viscosifying agent normally comprises a block copolymer.

The buoyant fluid is typically a liquid. The buoyant fluid is typically incompressible or at least substantially incompressible. The buoyant fluid is normally a liquid and thereby incompressible. It may be an advantage of the present invention that when the buoyant fluid is underwater, the buoyant fluid is incompressible and therefore the volume of a fixed quantity of the buoyant fluid does not change or at least does not substantially change with a change in underwater depth and therefore also pressure. This provides an operator with greater control of the apparatus underwater that contains the buoyant fluid compared to using, for example, a gas. The volume of a fixed quantity of a gas changes substantially with a change in underwater depth and pressure.

The buoyant fluid typically comprises from 40 to 70% vol/vol base fluid, optionally from 50 to 60% vol/vol base fluid and normally 53% base fluid.

The base fluid may have a relatively low viscosity, that is a viscosity of from 1 to 5 cSt at 40° C. The flash point of the base fluid may be from 75 to 125° C. The base fluid may have a relatively high flash point, that is a flash point of more than or equal to 90° C. The base fluid may be sheen free.

The base fluid may have a density of from 0.7 to 1 kg/l at 15° C. The lower the density of the base fluid the less microspheres are required to provide the buoyant fluid with the required buoyancy. The density of the base fluid may be from 0.7 to 1 g/cc, typically 0.76 g/cc. The base fluid may have a specific gravity of more than 0.40 g/cm$^3$, optionally more than 0.45 g/cm$^3$, and may be more than 0.50 g/cm$^3$. The pour point may be from 0 to less than −48° C.

The base fluid may be an oil. The oil may be a mineral oil. The oil is typically a liquid. The oil may be the majority component vol/vol or wt/wt of the base fluid.

The oil is preferably a low toxicity oil, such as a hydrocarbon, an alkane, an aliphatic oil, poly-alpha-olefin, alkyl ester and/or vegetable oil. The base fluid may have a very low toxicity to marine life, the aquatic toxicity for fish $LC_{50}$ being greater than or equal to 1000 mg/l. The base fluid may be referred to as having a low and/or relatively low aromaticity. The base fluid may be SIPDRILL™.

The oil may be biodegradable, for example vegetable oil. Thus for certain embodiments of the invention, the inherent risk of environmental damage posed by the buoyant fluid leaking from a chamber is mitigated and therefore not a significant concern because the biodegradable oil used does not present an environmental risk or concern to wildlife.

In an alternative embodiment the base fluid may comprise water.

The buoyant fluid typically comprises from 0.5 to 5% vol/vol viscosifying agent, optionally from 1 to 3% vol/vol viscosifying agent and typically 1.6% vol/vol viscosifying agent.

The viscosifying agent typically increases the viscosity and/or changes the rheological profile of the buoyant fluid. The viscosity of the buoyant fluid comprising the viscosifying agent typically decreases with an increase in shear rate. The decrease in viscosity with an increase in shear rate may be referred to as shear thinning. Typically when the buoyant fluid is subjected to shear forces, for example when being pumped and/or transferred from one container to another, the viscosity of the buoyant fluid reduces and the buoyant fluid flows relatively freely. Typically when the shear forces are removed, for example when the buoyant fluid is being stored in a container, the viscosity increases, helping to keep the buoyant fluid a homogeneous mixture of the base fluid, microspheres, viscosifying agent and dispersant when present.

The viscosifying agent typically helps to suspend the microspheres in the buoyant fluid.

The block copolymer of the viscosifying agent typically comprises two or more homopolymer subunits joined together with one or more covalent bonds. There may be a junction block between the two or more homopolymer subunits. The block copolymer may be a diblock copolymer with two distinct blocks.

The block copolymer of the viscosifying agent may be a linear diblock copolymer of styrene and one or more of ethylene, propylene and butadiene. The styrene content of the linear diblock copolymer may be between 20 and 35%, typically 28% wt/wt. The viscosifying agent typically forms a plurality of micelles. The plurality of micelles typically provides the shear thinning characteristics described above. The viscosifying agent may be KRATON™.

The plurality of micelles typically comprise a core of poly(styrene) heads and a corona of poly(ethylene-co-propylene) and/or hydrogenated p(isoprene) tails.

The plurality of micelles may be formable after the viscosifying agent has been added to the base fluid and the mixture heated to more than or equal to 50° C., typically more than or equal to 60° C. and normally more than or equal to 70° C.

Alternatively the viscosifying agent may be a polysaccharide. The viscosifying agent may comprise a plurality of pentasaccharide repeat units. The plurality of pentasaccharide repeat units typically comprise one or more of glucose, mannose, and glucuronic acid. The viscosifying agent may be xanthan gum.

The microspheres are normally mixed with the viscosifying agent and/or a mixture of the viscosifying agent and the base fluid. The mixture may be referred to as a viscosified base fluid. The mixture may also contain a dispersant. The mixture may be referred to as buoyant fluid. One or more of the base fluid, microspheres, viscosifying agent, dispersant when present, and buoyant fluid may be heated to at least 70° C. Heating one or more of the base fluid, microspheres, viscosifying agent, dispersant when present, and buoyant fluid typically helps to make the buoyant fluid a homogenous mixture of two or more of the base fluid, microspheres, viscosifying agent and dispersant.

The buoyant fluid comprising the viscosifying agent is typically a stable mixture in the temperature range of from −10 to 100° C., typically from 0 to 70° C. It may be an advantage of the present invention that the buoyant fluid is typically a stable mixture. The buoyant fluid is a stable mixture when the components of the buoyant fluid do not separate or split from one another over time and/or with an increase in temperature.

The microspheres may each have a sealed chamber containing a gas or an at least a partial vacuum. The microspheres may be from 1 μm to 5 mm in diameter, optionally from 5 to 500 μm in diameter and typically from 20 to 200 μm in diameter.

The microspheres are typically rigid and so are incompressible at underwater pressures. The microspheres may be obtained from 3M™. The microspheres may be rated to over 2,000 kPa (300 psi), normally over 31,000 kPa (4500 psi), preferably over 41,000 kPa (6000 psi) and optionally over 55,000 kPA (8000 psi). Other microspheres with different strengths and densities may be used and generally stronger microspheres have higher densities. The higher the rating of the microspheres, the deeper the water and/or deeper in the water that they can be used in.

The microspheres may be glass microspheres. The microspheres may lower the density of the buoyant fluid to a density of approximately 530 kg/m³ at room temperature.

The buoyant fluid typically comprises from 25 to 60% vol/vol microspheres, optionally from 30 to 50% vol/vol microspheres and typically less than 55% vol/vol microspheres. The vol/vol of microspheres used is typically chosen to match the buoyancy required. If the vol/vol microspheres is however too high, the microspheres may contact one another and thereby be damaged or break so reducing the buoyancy they provide.

The vol/vol of microspheres used typically varies depending on the depth rating of the buoyant fluid. The vol/vol of microspheres used is normally a balance between the density of the buoyant fluid required and the depth rating of the buoyant fluid.

The grade of microspheres is also important. The sealed chamber of each microsphere is typically defined by a wall. The grade of the microspheres refers to the thickness of the wall.

The microspheres may be referred to as rigid containers. The sealed chamber of each microsphere may be referred to as a sealed void or may contain a gas.

The buoyant fluid typically also comprises a dispersant. The buoyant fluid typically comprises from 0 to 3% vol/vol dispersant, optionally from 0.5 to 2% vol/vol dispersant and typically 0.6% vol/vol dispersant. The dispersant typically helps to mitigate coagulation of the microspheres. Dispersion rather than coagulation of microspheres increases the flowability of the buoyant fluid, that is the ability of the buoyant fluid to flow.

The dispersant may be an imidazoline. The imidazoline is normally derived from an imidazole by the addition of H₂ across one of two double bonds. The imidazoline is typically one or more of 2-imidazolines, 3-imidazoline and 4-imidazoline.

The dispersant may be a surfactant. The dispersant may be poly(ethylene glycol) (PEG) dioleate having the formula:

CH3(CH2)7CH=CH(CH2)7CO(OCH2CH2)$n$O2C (CH2)7CH=CH(CH2)7CH3.

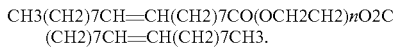

The PEG dioleate typically interacts with a hydrophilic outer surface of the microspheres and hydrophobic oil of the base fluid.

The dispersant may be a combination of an imidazoline and poly(ethylene glycol) (PEG) dioleate.

The buoyant fluid may have a specific gravity of less than 0.70 g/cm³, optionally less than 0.65 g/cm³, typically less than 0.60 g/cm³, and often less than 0.55 g/cm³.

The buoyant fluid may have a viscosity of from 9000 to 12000 mPa·s at a shear rate of 1.1 s⁻¹ at 293K and 900 to 1200 mPa·s at a shear rate of 113 s⁻¹ at 293K.

The viscosities detailed herein were determined using a Chandler 35 rotational viscometer with a number 1 spring and R1B2 rotor-bob configuration, this allows the shear rate to be calculated as (0.37723*RPM) and viscosity as (300/RPM*8.91*dial reading).

The buoyant fluid normally provides lift of from 200 to 600 kg/m³, typically from 425 to 500 kg/m³.

In an alternative embodiment the dispersant may have from 50 to 100% m/M (mass/Molecular mass) of a polyamine amide salt and/or from 12.5 to 20% m/M of 2-butoxyethanol. The dispersant may be BYK-W 980™ This dispersant is preferable when the buoyant fluid is water-based.

An embodiment of the invention will now be described by way of example only and with reference to the accompanying drawings, in which:

FIG. 1 is a schematic view of the apparatus for lifting and moving an object that us underwater.

FIG. 1 shows an apparatus 10 for lifting and moving an object that is underwater. The apparatus 10 comprises a first 12 and a second 14 chamber. Both chambers 12, 14 contain a first fluid 16 and a second fluid 18.

The first chamber 12 houses a first 22 and a second 24 container. The first container 22 contains the first fluid 16; the second container 24 contains the second fluid 18. The second chamber 14 houses a third 26 and a fourth 28 container. The third container 26 contains the first fluid 16; the fourth container 28 contains the second fluid 18. The first 16 and second 18 fluids are kept separate using the first 22 and the second 24 and the third 26 and the fourth 28 containers.

The first 22 and third 26 containers are bags. The second 24 and fourth 28 containers are the remaining space in the first 12 and second 14 chambers respectively. In an alternative embodiment the second 24 and forth 28 containers may also be bags.

A first conduit 20 is in fluid communication with the first container 22 of the first chamber 12 and the third container 26 of the second container 14. A second conduit 21 is in fluid communication with the second container 24 of the first chamber 12 and the fourth container 28 of the second chamber 14.

The conduits 20 & 21 are in fluid communication with the first 12 and second 14 chambers. The first fluid 16 and second fluid 18 are moveable between the first 12 and second 14 chambers through the conduits 20 & 21 respectively.

The first fluid 16 is brine. The second fluid 18 is an incompressible buoyant fluid.

The apparatus comprises two pumps 30 & 31 for moving the first fluid 16 through the conduit 20 between the first 22 and second 26 chambers. The pumps 30 & 31 are in-line with the conduit 20. In an alternative embodiment a single reversible pump may be used.

In use, the first fluid 16 is pumped through the conduit 20 from the first container 26 of the second chamber 14 into the first container 22 of the first chamber 12 using the pumps 30 & 31. When the amount of the first fluid 16 in the first container 22 of the first chamber 12 is increased, the amount of the second fluid 18 in the second container 24 of the first chamber 12 is decreased. The second fluid 18 is pushed out of the second container 24, along the second conduit 21, and into the second container 28 of the second chamber 14.

Pumping the first fluid 16 provides an efficient way of moving the second fluid 18 between the first 12 and second 14 chambers.

In use, when the volume of the first fluid 16 in the first container 22 is increased, the volume of the first fluid 16 in the third container 26 is decreased. This displaces the second fluid 18 out of the second container 24, into the fourth container 28. This increases the volume of the second fluid 18 in the fourth container 28, thereby increasing the buoyancy of the second chamber 14 and reducing the buoyancy of the first chamber 12. The mass of the second chamber 14 is reduced; the mass of the first chamber 12 is increased.

An object (not shown) is securable to the second chamber 14. In use the object is secured under the second chamber 14.

In use, the increased buoyancy of the second chamber 14 creates an underwater buoyant force that is used to lift the object.

The increased buoyancy of the second chamber 14 is used to lift the object. In use the buoyancy of the second chamber 14 is increased so that the second chamber is neutrally buoyant. The second chamber 14 is then suitably positioned to lift the object. The buoyancy of the second chamber 14 is then increased further so that the second chamber and the object are neutrally buoyant. The object is then moved to where it is needed by moving the second chamber 14 and the object (not shown) attached thereto. When the object is over the correct new location, the buoyancy of the second chamber 14 is then reduced by pumping some of the first fluid 16 in the first container 22 of the first chamber 12 back into the first container 26 of the second chamber 14, and the object is lowered into position. Once sited, the object can be detached from the second chamber 14 and the second chamber moved away.

The apparatus 10 provides an efficient way to lift and move an object that is underwater compared to other known apparatus and methods for a similar purpose. For example, if a load of 1000 kgs is to be lifted and moved using a bag for a buoyant fluid, the bag needs to be attached to the object empty and then filled with ca. 2000 litres of buoyant fluid. Assuming a pump rate of 20 litres/min this will take 100 minutes. Each litre of buoyant fluid gives 0.5 kg of lift for example. The object is then moved but before the bag can be disconnected, all the buoyant fluid must be pumped out, otherwise the bag and anything attached to it will rise to the surface uncontrollably. This takes a total time of 200 minutes (nearly four hours) for a simple lift.

Using the apparatus of the present invention, for every litre of ballast fluid pumped out of the lifting element, a litre of buoyant fluid is pumped in. The buoyancy change for every litre of fluid pumped is therefore 1.0 kg, compared to 0.8 kg. Consequently, only 1000 litres of fluid, typically ballast fluid, needs to be pumped to lift the object. At 20 litres/min this takes 50 minutes. Once the object is in place, only 1000 litres of ballast fluid needs to be pumped before the lifting element can be safely disconnected again, this again only taking 50 mins. In total it takes 100 minutes to carry out the move. That is half the time compared to other known apparatus and methods for a similar purpose.

The first and second fluids are substantially incompressible. This means there is little change in the buoyant force provided with changes in depth. The buoyant force is directly proportional to the volume of first fluid 16 pumped and the second fluid 18 that is displaced.

The buoyant fluid 18 comprises a base fluid, microspheres, and a viscosifying agent.

The buoyant fluid comprises 53% base fluid. The base fluid has a viscosity of from 1 to 5 cSt at 40° C. The flash point of the base fluid is more than or equal to 90° C. The base fluid has a density of 0.76 g/cc. The base fluid has a specific gravity of more than 0.50 g/cm$^3$. The pour point is from 0 to less than −48° C. The base fluid is a mineral oil.

The buoyant fluid comprises 1.6% vol/vol viscosifying agent. The viscosifying agent is a block copolymer. The block copolymer is a linear diblock copolymer of styrene and one or more of ethylene, propylene and butadiene. The styrene content of the linear diblock copolymer is 28% wt/wt. The viscosifying agent may be KRATON™.

The buoyant fluid comprises less than 55% vol/vol microspheres. The vol/vol of microspheres used is chosen to match the buoyancy required. The vol/vol of microspheres used varies depending on the depth rating of the buoyant fluid. The microspheres each have a sealed chamber containing a gas. The microspheres are from 20 to 200 μm in diameter. The microspheres are rigid and so are incompressible at underwater pressures. The microspheres are rated to over 2,000 kPa (300 psi). The microspheres are glass microspheres.

The buoyant fluid also comprises a dispersant. The dispersant is a combination of an imidazoline and poly(ethylene glycol) (PEG) dioleate. The buoyant fluid comprises 0.6% vol/vol dispersant.

The buoyant fluid has a specific gravity of less than 0.55 g/cm$^3$.

The buoyant fluid provides lift of from 425 to 500 kg/m$^3$.

Modifications and improvements can be incorporated herein without departing from the scope of the invention.

The invention claimed is:

1. A method for lifting and moving an object that is submerged in a body of water, the method comprising the steps of:
    deploying an apparatus with a first and a second chamber from a surface of the body of water to a bottom of the body of water, both chambers containing a first and a second fluid,
        wherein the first fluid is brine with a density higher than a density of the water, and the second fluid is a fluid having a density of less than 0.7 kg/L,
        the first chamber housing a first and a second container, the first fluid in the first container, the second fluid in the second container; and the second chamber housing a third and a fourth container, the first fluid in the third container, the second fluid in the fourth container;
    providing a first conduit in fluid communication with the first container of the first chamber and the third container of the second chamber, and a second conduit in fluid communication with the second container of the first chamber and the fourth container of the second chamber;
    securing the object to the second chamber; and
    lifting the object by increasing the buoyancy of the second chamber, wherein the step of lifting the object comprises moving a volume of the first fluid from the third container along the first conduit and into the first container and, simultaneously, substantially the same volume of the second fluid from the second container along the second conduit and into the fourth container;
    wherein the second fluid comprises from 0 to 3% vol/vol dispersant and wherein the dispersant is a combination of an imidazoline and a poly(ethylene glycol) (PEG).

2. The method according to claim 1, wherein the density of the first fluid is from 1.3 to 2 kg/L.

3. The method according to claim 1, further comprising a pump for moving the first fluid through the conduit between the first and second chambers.

4. The method according to claim 1, wherein the first and third containers are bags, and the second and fourth containers are the remaining space in the first and second chambers respectively.

5. The method according to claim 1, wherein the amount of the second fluid in the second chamber is adjusted to control the amount of buoyancy provided by the second chamber and therefore control the position of the object attachable thereto, more second fluid in the second chamber, more buoyancy; less second fluid in the second chamber, less buoyancy.

6. The method according to claim 1, wherein the volume of the second fluid is moved from the second to the fourth container by moving the volume of the first fluid from the third to the first container.

7. The method according to claim 1, wherein the second fluid further comprises a base fluid, microspheres, and a viscosifying agent.

8. The method according to claim 1, wherein the second fluid is substantially incompressible and therefore the volume of a fixed quantity of the second fluid does not substantially change with a change in underwater depth and pressure.

9. The method according to claim 7, wherein the second fluid comprises from 40 to 70% vol/vol base fluid.

10. The method according to claim 7, wherein the base fluid has a specific gravity of more than 0.40 g/cm$^3$.

11. The method according to claim 7, wherein the second fluid comprises from 0.5 to 5% vol/vol viscosifying agent.

12. The method according to claim 7, wherein the viscosifying agent is a block copolymer, the block copolymer is a linear diblock copolymer of styrene and one or more of ethylene, propylene and butadiene.

13. The method according to claim 7, wherein the second fluid comprises from 25 to 60% vol/vol microspheres.

14. A method according to claim 1, wherein the first fluid comprises dissolved salts of one or more of caesium, calcium and sodium bromide, potassium formate and/or acetate.

* * * * *